Sept. 5, 1967

A. A. MELINDER 3,339,256

TURNING AND BORING TOOL

Filed Jan. 20, 1967

Arthur A. Melinder
INVENTOR

BY Lee R Larkin

ATTORNEY

United States Patent Office 3,339,256
Patented Sept. 5, 1967

3,339,256
TURNING AND BORING TOOL
Arthur A. Melinder, 10006 Hanka,
Houston, Tex. 77055
Filed Jan. 20, 1967, Ser. No. 610,686
6 Claims. (Cl. 29—96)

ABSTRACT OF THE DISCLOSURE

A tool for use in cutting and boring members made of materials such as metal. The tool includes a hardened metal insert which is mounted for cutting engagement with the member which is to be cut or bored, and locking means for securing the insert in a fixed position relative to the shank in which it is mounted.

---

Figure 1:
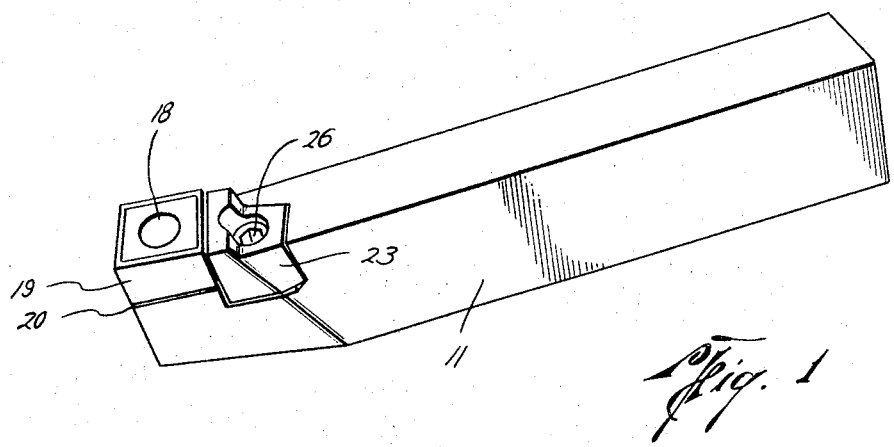

This invention relates to a tool for use in cutting and boring. More particularly, this invention relates to a turning and boring tool having a hardened metal insert which is adapted for cutting engagement with the member to be cut or bored and includes novel means for securing the insert in a fixed and locked position relative to the shank on which it is mounted, which locking means is easily operable and which prevents the insert from becoming wedged in the locked position to the extent that it is difficult to remove the insert therefrom.

There are many problems associated with providing a cutting and boring tool which is satisfactory under all conditions. It is common practice to use a hardened steel insert, such as a carbide insert which can be square, triangular, rectangular, or even round, as well as many other slopes, with a plurality of cutting surfaces. As these various cutting surfaces become dulled by use, it is common practice to rotate the insert to present the insert to present a new surface to perform the cutting operation which requires that the machine operator loosens the locking means which secures the insert in position, whereby the insert may be readily rotated and subsequently locked in position. Tools of this type are normally used for very close tolerance work and it is necessary that the insert be locked in the same relative position to the shank during the indexing described above, and that the insert be held in a non-moveable position relative to the shank during actual cutting operations. At the same time, it is necessary that the lock arrangement be such that it can be conveniently unlocked and such that the insert will not be frozen in the locked position, which prevents its being indexed conveniently by the mill operator.

Many tools have been designed for the purpose of attempting to solve certain of the foregoing problems. Certain prior art tools use an eccentric pin whereby the insert is rotated to and from the locked position. However, this arrangement tends to freeze in the locked position, and becomes difficult to unlock; it fails because of early failure of the pin; or is otherwise unsatisfactory. Other prior art tools have attempted to use a locking pin which acts upon another pin to cam it to a locking position with respect to the insert. These structures are generally relatively complicated and are subject to early failure. Other tools have been developed which utilize a wedge which is pressed against the rearward side of the insert but which wedge is improperly formed and mounted to prevent displacement of the insert during use thereof, and is otherwise unsuitable.

It is therefore an object of the present invention to provide an improved cutting and boring tool which overcomes the foregoing problems, which provides a tool which securely holds the insert, which does not freeze in a locked position, which may be readily operated and which is economical in use.

Briefly stated, the tool of this invention includes a shank having a generally transversely extending and generally dove-tailed slot near the forward end thereof, with the slot having a screw hole in the bottom thereof, and stop means at the rearward side thereof. The tool is provided with a pin connected to the shank forwardly of the slot, which pin is adapted to support a cutting insert thereon. A cutting insert of hardened metal is removably mounted on the pin in a cutting position. The tool also includes a locking member mounted in the slot, with the locking member having a screw recess passing downwardly therethrough and mating with the screw hole in the shank. This locking member has a rearward side and a bottom side which meet at an angle which is less than 90°. The tool also includes a locking screw which passes downwardly through the locking member and threads into the screw hole of the shank, whereby the rearward side of the locking member engages the stop means and the upper end of the forward side of the locking member is pressed against the back side of the insert in locking relationship by tightening the locking screw. In the preferred embodiment, the angle formed by the top surface of the shank and the rearward surface of the slot is less than about 90°.

Reference to the drawing will further explain the invention wherein:

FIG. 1. is an isometric view of a negative rake tool made in accordance with the teachings of this application, utilizing a square insert mounted to provide a 15° cutting surface.

Figure 2:
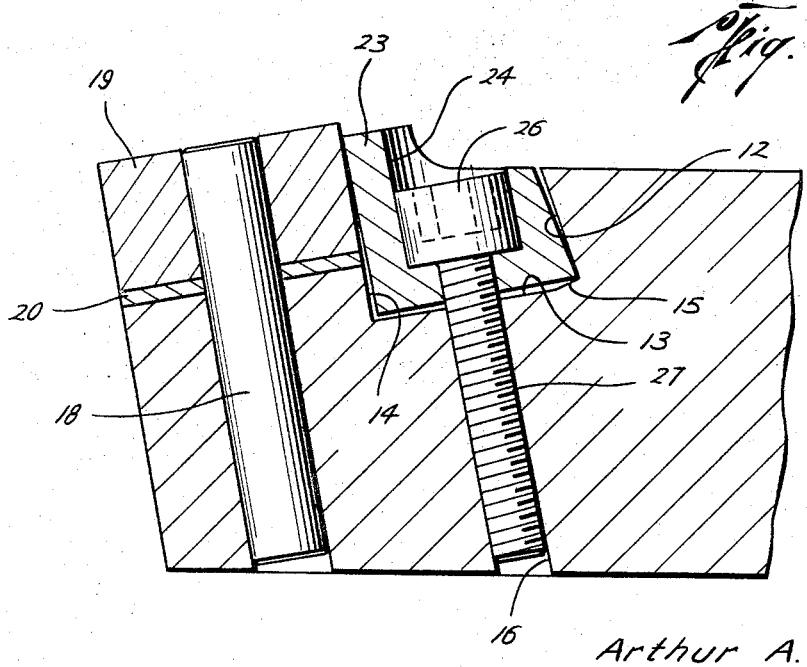

FIG. 2 is a partial central vertical sectional view taken through the forward end of the tool shown in FIG. 1.

Referring now to the drawing, the tool includes a generally elongated shank 11 of any suitable material such as steel havin a generally transversely extending and generally dove-tailed slot near the forward end thereof, which slot is identified as having a rearward surface 12, bottom surface 13, forward surface 14 and connecting surface 15, joining surface 12 and 13. Surface 15 is formed by a portion of shank 11 which is raised relative to the plane of surface 13, and forms what may be referred to as stop means, the purpose of which will be explained hereinafter.

Further, the angle formed between the top surface (long axis) of shank 11 and rearward surface 12 is less than 90° (74° for example). Further, bottom surface 13 slopes downwardly toward the forward end of shank 11. Surfaces 13 and 14, as shown, meet at an angle of 90°, and to each other, surfaces 12 and 15 also form an angle of 90°, and surfaces 12 and 13 form an angle of about 82° with respect to each other.

Shank 11 is provided with a screw hole 16 which extends generally downwardly through shank 11 from bottom surface 13. Shank 11 has press fitted therein pin 18 forwardly of the said dove-tailed slot, which pin is adapted to support cutting insert 19 and shim 20 thereon. Shim 20 may be of any hardened metal which is for the purpose of properly supporting carbide insert 19 relative to shank 11. Insert 19 is generally of hardened material such as carbide and is provided with a plurality of cutting surfaces which may be rotated so as to provide a new cutting surface when one old one has become dulled by use. Further, insert 19 may be inverted such that the cutting edges on the bottom side thereof may also be utilized. It is to be understood that inserts of this type are generally old and extensively used in the art. Further, insert 19 is sized to loosely fit over pin 18 so that it may be removed therefrom and rotated by hand.

Preferably, pin 18 is mounted such that the long axis thereof forms an angle greater than 90° (for example, 98° as shown) with the long axis of shank 11, whereby the tool is provided with a negative rake.

Insert 19 is locked in position during use by means of a locking member mounted in the aforesaid dovetailed slot in shank 11, conveniently in the form of block 23. Block 23 is provided with a screw head recess 24 which extends downwardly thereinto for receiving allen screw head 26 of lock screw 27 which is threaded into screw hole 16 of shank 11.

Block 23 has a rearward side and a bottom side which meet at an angle which is less than 90°, as for example, 82°, and a front side which forms a 90° angle with the bottom side.

Block 23 is shorter in length than said slot in the linear or axial direction of shank 11. This permits block 23 to tilt forward in the slot when the rearward edge engages the stop means in the slot in the form of surface 15. In the locked position, lock screw 27 forces the forward top edge of block 23 to bear against insert 19 which, in turn, is pressed against pin 18, to thereby lock insert 19 securely in place.

Because of the novel configuration of block 23, it can be removed from the tool by loosening locking screw 27, whereby carbide insert 19 may be indexed, inverted or replaced.

The counter force applied to insert 19 during the cutting operation tends to force block 23 tighter against rearward side 12 and connecting side 15 (forming the stop means) of the dove-tailed slot of shank 11, causing block 23 to lock even tighter. The novel construction of block 23 and the dove-tailed slot is such that the bottom surface of wedge 23 and bottom surface 13 are not parallel when in the locked position because block 23 is pivoted or tilted forwardly and against insert 19, when lock screw 27 is tightened.

Block 23 can not freeze into a locked position under a work load because of this novel arrangement. The moment that lock screw 27 is loosened, block 23 becomes loose permitting the aforesaid indexing of insert 19.

There are many advantages of a tool made in accordance with this invention over the prior art. The tool is designed for economy and high performance. The novel construction of block 23 and the slot into which it fits causes insert 19 to be held in place and to resist greater forces thereby permitting deeper and heavier cuts during the turning and boring operations. Shank 11 is straight throughout its length and is therefore easier to position and manipulate. The tool of this invention is simple of construction and hence provides greater economy than prior art tools. It has greater ease in handling and is not subjected to being frozen in the locked position thereby increasing the speed of indexing the insert.

Lock screw 27 is of standard construction and may be replaced at a minimum cost. The locking action of block 23 is constant, permitting accurate indexing of insert 19 for close tolerance work.

It is to be understood that inserts of different configuration or having a greater number of cutting sides can be used, as is noted above.

While connecting surface 15 has been described as stop means, it should be understood that these stop means may take other forms. For example, the dove-tailed slot in shank 11 could be milled out to remove that portion which forms connecting surface 15 of the slot. In addition, block 23 could be milled or formed such that the angle formed by the back and bottom sides thereof is less than the angle formed by the bottom surface 13 and rearward surface 12 of the slot. Thus, the back part of bottom surface 13 would act as the stop means, and cause block 23 to tilt forward because of the smaller angle formed by the bottom and rearward sides thereof. Never-the-less, block 23 is tilted forward when lock screw 27 is tightened.

Further modifications may be made in the invention as described without departing from the scope of the invention. Accordingly, the foregoing description is to be construed as illustratively only and is not to be construed as a limitation upon the invention as defined in the following claims.

What is claimed is:

1. A tool for use in cutting and boring, said tool comprising:
   a shank having a generally transversely extending and generally dove-tailed slot near the forward end thereof, said slot having a screw hole in the bottom thereof and stop means at the rearward side thereof;
   a pin connected to said shank forwardly of said slot and adapted to support a cutting insert thereon;
   a cutting insert of hardened metal removably mounted on said pin in a cutting position;
   a locking member mounted in said slot, said locking member having a screw recess passing downwardly therethrough and mating with said screw hole in said shank, and said locking member having a rearward side and a bottom side which meet at an angle which is less than 90°;
   and a locking screw passing through said locking member and threaded into said screw hole in said shank, whereby the rearward side of said locking member engages said stop means and the upper end of the forward side of said locking member is pressed against the back side of said insert in locking relationship by tightening said locking screw.

2. The tool as claimed in claim 1 wherein:
   the angle formed by the top surface of said shank and the rearward surface of said slot is less than 90°.

3. The tool as claimed in claim 2 wherein:
   said pin is press fitted in the forward end of said shank such that the angle between the long axis of the pin and the long axis of the shank is greater than 90°, whereby the said tool is provided with a negative rake.

4. The tool as claimed in claim 2 wherein:
   the bottom of said slot slopes downwardly toward the forward end of said shank.

5. A negative rake tool for cutting and boring comprising:
   a shank having a generally transversely extending and generally dove-tailed slot near the forward end thereof, said slot having a screw hole in the bottom thereof, and stop means at the rearward side thereof, and said slot being formed such that the angle between the top surface of said shank and the rearward surface of said slot is less than 90°;
   a pin connected to the forward end of said shank forwardly of said slot, with angle between the long axis of the pin and the long axis of the shank being greater than 90°, with said pin adapted to removably support a cutting insert thereon, whereby said tool is provided with a negative rake;
   a cutting insert of hardened metal removably mounted on said pin in a cutting position;
   a locking member mounted in said slot, said locking member having a screw recess passing downwardly therethrough and mating with said screw hole in said shank, and said locking member being shorter in length than the length of said slot in the linear direction, whereby said locking member is tilted forward relative to said slot by engagement of the rearward side of said locking member with said stop means;
   and a locking screw passing downwardly through said locking member and threaded into said screw hole, whereby the upper end of the forward side of said locking member is tilted and against the back side of said insert in locking relationship by tightening said locking screw.

6. The tool as claimed in claim 5 wherein:
said locking member is in the form of a block, with the bottom and forward sides forming an angle of about 90°, and the bottom and rearward sides forming an angle of less than 90°.

References Cited

UNITED STATES PATENTS 3,192,603   7/1965   Greenleaf _____ 29—96

HARRISON L. HINSON, *Primary Examiner.*